(12) United States Patent
Evans (10) Patent No.: US 8,966,999 B2
(45) Date of Patent: Mar. 3, 2015

(54) PRESSURE SENSOR LINEARIZATION

(75) Inventor: Duane Martin Evans, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 13/163,006

(22) Filed: Jun. 17, 2011

(65) Prior Publication Data

US 2012/0318070 A1    Dec. 20, 2012

(51) Int. Cl.
*G01L 1/00* (2006.01)
*G06F 3/041* (2006.01)
*G01L 25/00* (2006.01)
*G01L 1/20* (2006.01)

(52) U.S. Cl.
CPC ............ *G06F 3/0414* (2013.01); *G01L 25/00* (2013.01); *G01L 1/20* (2013.01)
USPC ....... 73/862.68; 73/719; 73/723; 73/862.381; 73/1.35; 73/114.18

(58) Field of Classification Search
CPC  A45F 2005/008; A61B 5/024; A61B 5/1038; A61B 5/14532; A61B 2562/08; A61B 5/002; A61B 5/1495; A61B 5/7221; G10H 2230/095; G10H 1/0066; G06F 3/041; G06F 3/0488; F16H 35/00; B23Q 9/0042; B23Q 2210/006; B23K 37/0211; B23K 37/0217; G01L 19/04; G01L 19/0645; G01L 19/0084; G01L 19/147; G01L 9/0042; A63B 2210/50; A63B 21/225; A63B 2022/0676; A61K 38/00; A61K 2300/00; H01L 2924/0002; C12Q 2521/10
USPC ................. 73/862.68, 862.381, 1.35, 114, 18
See application file for complete search history.

(56) References Cited

U.S. PATENT DOCUMENTS

| | | | | |
|---|---|---|---|---|
| 3,638,481 | A | * | 2/1972 | Wilner ........................ 73/862.68 |
| 4,763,534 | A | * | 8/1988 | Hager ......................... 73/862.68 |
| 5,216,193 | A | * | 6/1993 | Masubuchi .................... 84/600 |
| 5,583,303 | A | * | 12/1996 | Franz ........................ 73/862.046 |
| 6,026,694 | A | * | 2/2000 | Gray .......................... 73/862.68 |
| 6,102,802 | A | * | 8/2000 | Armstrong ...................... 463/37 |
| 6,549,193 | B1 | | 4/2003 | Huang et al. |
| 6,673,390 | B2 | | 1/2004 | Chen |

(Continued)

OTHER PUBLICATIONS

Malacaria; "A Thin, Flexible, Matrix-Based Pressure Sensor"—Published Date Sep. 1998, http://archives.sensorsmag.com/articles/0998/thi0998/main.shtml.

(Continued)

*Primary Examiner* — Peter Macchiarolo
*Assistant Examiner* — Mohammed Keramet-Amircola
(74) *Attorney, Agent, or Firm* — Jeremy Snodgrass; Judy Yee; Micky Minhas (57) ABSTRACT

One or more techniques and/or systems are disclosed for generating a linearized pressure sensor pattern for a pressure sensor. Force may be applied to a pressure sensor sample, comprising the pressure sensor without conductors. A patch, comprising an area of contact between a top and bottom surface of the sensor sample, can be measured, which corresponds to the applied force. Patch measurements can be made for respective applied force intervals, resulting in one or more indications of applied force, respectively corresponding to an indication of a patch measurement. The linearized pressure sensor pattern can be generated using the one or more force indications and corresponding patch measurement indications.

20 Claims, 9 Drawing Sheets

(56) References Cited

U.S. PATENT DOCUMENTS

| | | | |
|---|---|---|---|
| 7,180,508 | B2 | 2/2007 | Kent et al. |
| 7,893,337 | B2* | 2/2011 | Lenz .......................... 84/477 R |
| 7,926,351 | B2* | 4/2011 | Masaki et al. .................. 73/718 |
| 8,511,174 | B2* | 8/2013 | Herrmann et al. ............... 73/774 |
| 2001/0040550 | A1* | 11/2001 | Vance et al. ................... 345/156 |
| 2004/0159166 | A1* | 8/2004 | Schiller ................... 73/862.381 |
| 2006/0196343 | A1* | 9/2006 | Yung .......................... 84/470 R |
| 2006/0279548 | A1* | 12/2006 | Geaghan ...................... 345/173 |
| 2008/0173104 | A1* | 7/2008 | German .................. 73/862.381 |
| 2009/0315989 | A1* | 12/2009 | Adelson ........................ 348/135 |
| 2010/0037755 | A1* | 2/2010 | McMillen et al. .............. 84/645 |
| 2010/0156845 | A1* | 6/2010 | Kim et al. ..................... 345/174 |
| 2011/0049264 | A1* | 3/2011 | Zimmermann et al. ...... 239/266 |
| 2011/0174084 | A1* | 7/2011 | West et al. ............... 73/862.581 |
| 2011/0319823 | A1* | 12/2011 | Bojan et al. ................... 604/151 |
| 2012/0067142 | A1* | 3/2012 | Shimojo et al. .......... 73/862.381 |

OTHER PUBLICATIONS

Dietz; et al., "A Practical Pressure Sensitive Computer Keyboard" Published Date—Oct. 4-7, 2009.

Hezarjaribi, et al., "Analytical and Simulation Evaluation for Diaphragm's Deflection and its Applications to Touch Mode MEMS Capacitive Pressure Sensor", Retrieved at << http://www.insipub.com/ajbas/2009/4281-4292.pdf >>, Australian Journal of Basic and Applied Sciences, vol. 3 No. 4, 2009, pp. 4281-4292.

Han, et al., "Smooth Contact Capacitive Pressure Sensors in Touch- and Peeling-Mode Operation", Retrieved at << http://ieeexplore.ieee.org/stamp/stamp.jsp?arnumber=04781932 >>, IEEE Sensors Journal, vol. 9 No. 3, Mar. 2009, pp. 199-206.

Abeysinghe, et al., "A novel MEMS pressure sensor fabricated on an optical fiber", Retrieved at << http://ieeexplore.ieee.org/stamp/stamp.jsp?tp=&arnumber=942671 >>, IEEE Photonics Technology Letters, vol. 13 No. 9, Sep. 2001, pp. 993-995.

* cited by examiner

PRESSURE SENSOR LINEARIZATION

BACKGROUND

There are a variety of ways that an electronic device may receive input. For example, computer-related devices often use a keyboard and/or a mouse, among other things; electronic musical instruments may use some form of button; computer games may use a controller; and light switches may uses a button, toggle, or slider for input. The input component of an electrical device can relay a user action to a connected device or component, such as powering on, adjusting a setting, or providing input for a program (e.g., text, direction, actions, etc.). An input component can comprise a pressure sensitive switch that provides at least two forms of user input: an activation of the input (e.g., by pressing a button), and a level of input (e.g., by pressing harder or lighter on the button). For example, a user may press a key on an electronic piano to play a note, and press harder to play the note louder.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A pressure sensor may be utilized by one or more types of input components, for example, where a level of input may be desired to be used, along with the activation of the input, in a single action (e.g., pressing a button). However, typical pressure sensors produce a non-linear output for an amount of applied force. In a typical pressure sensor, an applied force to electrical property output (e.g., resistance or conductivity) comprises an exponential relationship, for example, where an amount of change to the output decreases as an amount of applied force increases. That is, in this example, when the applied force nears a saturation point for the pressure sensor (e.g., additional force results in no additional change in output) the change in the output becomes less and less, such that highly sensitive (e.g., and expensive) sensors may be needed to detect the change.

Accordingly, one or more techniques and/or systems are disclosed for designing a linearized, pressure sensor, where applied force input is relatively proportional (e.g., or inversely proportional) to an output. A contact patch size between a top and bottom surface of a pressure sensor sample (e.g., without conductors) can be characterized, and correlated to a force applied to the sensor. A transfer function (e.g., an equation relating applied force to patch size) may be used to define a shape of a conductor used in the sensor, to linearize an output reading from the sensor. In this way, a measurement resolution of a pressure reading circuit (e.g., that converts applied force to an electrical output) can be improved, for example, as the applied force to output relationship is substantially linear (e.g., due to the linearization).

In one embodiment for generating a linearized pressure sensor pattern for a pressure sensor, an indication of a force applied to a pressure sensor sample can be received, where the pressure sensor sample may comprise elements of the pressure sensor, other than conductors used to make a connection between a top and bottom surface of the sensor. Further, an indication of a patch measurement can be received that corresponds to the force indication, where the patch may comprise an area of contact between the top and bottom surfaces of the sensor sample. Additionally, the linearized pressure sensor pattern can be generated using the force indication and the patch measurement indication.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for creating a pattern for a pressure sensor that can produce a substantially linear output across respective applied pressures. For example, the linearized pressure sensor pattern can be created and used for a resistance conductor utilized in a pressure sensor. In this example, for respective increases in force applied to the pressure sensor comprising the linearized pattern, a corresponding, monotonic decrease in resistance is output in a linear manner (e.g., inversely proportional relationship of applied force to resistance). A linear relationship between the input (e.g., force) and output (e.g., electrical resistance) for a pressure sensor, for example, may allow for improved measurement of the input near a saturation point (e.g., when force is applied to the pressure sensor near a maximum force point), which may also allow for less expensive detectors (e.g., that deform less and less as more and more force is applied) to be used for measuring the input.

Figure 1:
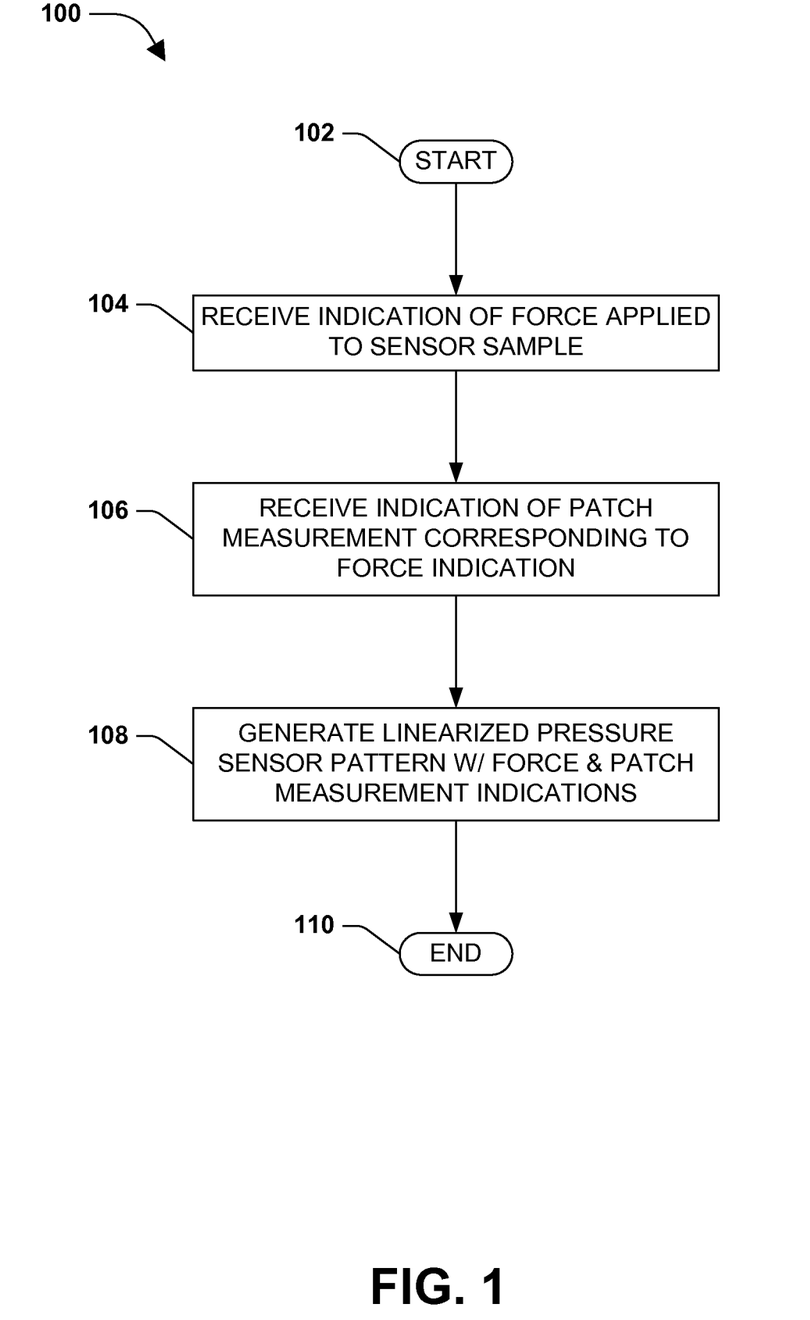
FIG. 1 is a flow diagram illustrating an exemplary method for generating a linearized pressure sensor pattern for a pressure sensor that may be used in a pressure sensitive switch.

FIG. 1 is a flow diagram illustrating an exemplary method 100 for generating a linearized pressure sensor pattern for a pressure sensor that may be used in a pressure sensitive switch. The exemplary method 100 begins at 102 and involves receiving an indication of a force applied to a pressure sensor sample, at 104. For example, a calibrated force imparting device (e.g., or a force application device in conjunction with a reference pressure sensor) can be used to apply (e.g., or detect) a force applied to a top surface of the sensor sample by translating a pressure of the force over the surface to an electrical property, such as resistance, conductivity, or derivatives thereof, for example. It may be appreciated that using calibrated force imparting device, for example, may allow the applied force to be known via a readout, for example, of the force imparting device. In one embodiment, the pressure sensor sample can merely comprise a similar arrangement of components as the pressure sensor, for example, such that it may be used to measure the force applied (e.g., and resulting characteristics) without having components needed to measure a corresponding electrical property. That is, the sample may resemble, replicate, etc. the sensor to the extent needed mimic the behavior of the sensor for "testing" purposes but need not comprise additional components otherwise needed for performing measurement functions of the sensor (e.g., that are not needed for "testing").

Figure 4A:
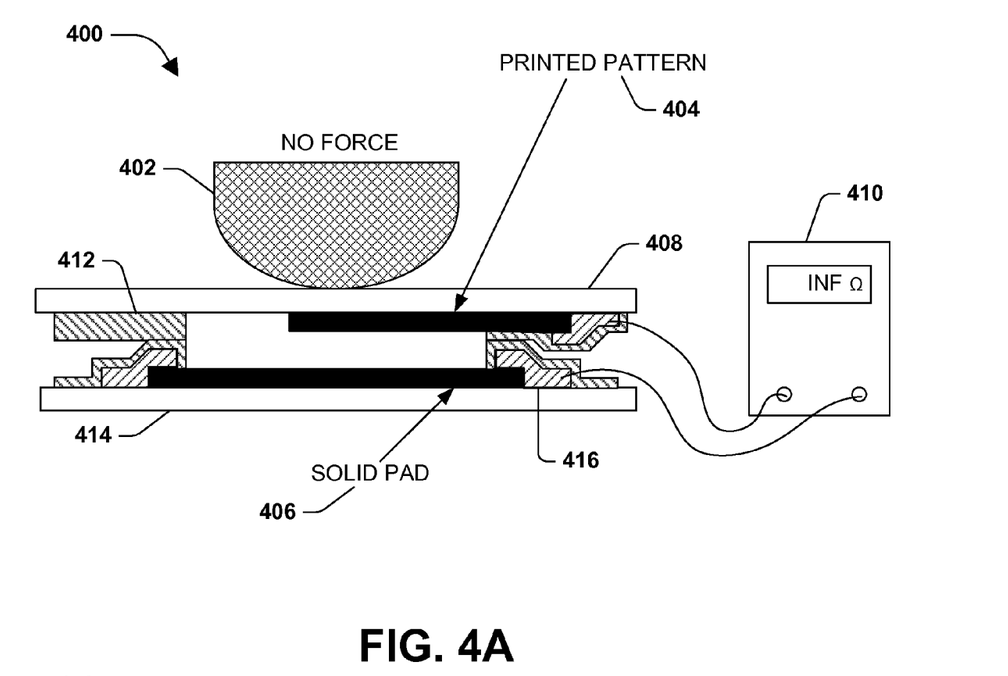
FIGS. 4A and 4B are component diagrams illustrating example embodiments of a pressure sensor.

As an illustrative example, FIG. 4A is an illustration of an example embodiment 400 of a pressure sensor in side-view. A top surface 408 of the example sensor 400 may comprise a flexible material, such as a polyester film (e.g., BoPET (Bi-axially-oriented polyethylene terephthalate), such as Mylar), and a bottom surface 414 may comprise a less flexible material, such as glass, fiberglass, or a base material that mitigates deflection of the sensor (e.g., does not readily bend). In one embodiment, the bottom surface 414 may, however, comprise the same (e.g., or similar) material as the top surface 408, or may comprise a different flexible (e.g., or semi-flexible) material. Further, a resistance conductor material, such as a carbon-based mix, can be applied to the top surface 408 as a top conductor 404, and to the bottom surface 414 as a bottom conductor 406. As an example, in FIG. 4B, when a force 470 is applied to the top surface 408 of the example sensor 450, the top conductor 404 can contact the bottom conductor 404, which changes (e.g., decreases) a resistance 460 in an electrical circuit (e.g., where such resistance may initially be zero or at a floating value 410 when no force is applied). Here, in this example, an increase in the force 470 applied corresponds to a decrease in the resistance 460, thereby providing an indication of the applied pressure or force.

In one embodiment, the pressure sensor sample (e.g., from 104 of FIG. 1) may comprise the example sensor 400 without the resistance conductor material 404, 406 (e.g., or some other conductor material). In this way, for example, resistance may not be measured from the sample, but the applied force may still be measured, or applied in known values and/or increments (e.g., by a robot or piece of testing equipment). As an example, the received indication of a force applied, at 104 of FIG. 1, may be measured when applied to the sensor sample, and may be applied in known, increasing force increments. Further, the force can be applied in a same direction orthogonal to the plane of the top surface 408 during the known, increasing force increments, for example, so that the pressure is relatively uniform and consistently applied at the respective, measured increments.

Returning to FIG. 1, at 106, an indication of a patch measurement corresponding to the force indication is received. For example, as described in FIGS. 4A and 4B, the pressure sensor sample may comprise the components and arrangement of a regular pressure sensor except for the conductor material 404, 406 used to measure the electrical property corresponding to the applied force. In this way, for example, when a force 470 is applied to the top surface 408 of the pressure sensor sample a contact area, comprising the patch, may be indicated where the top surface 408 and bottom surface 414 meet.

Figure 4B:
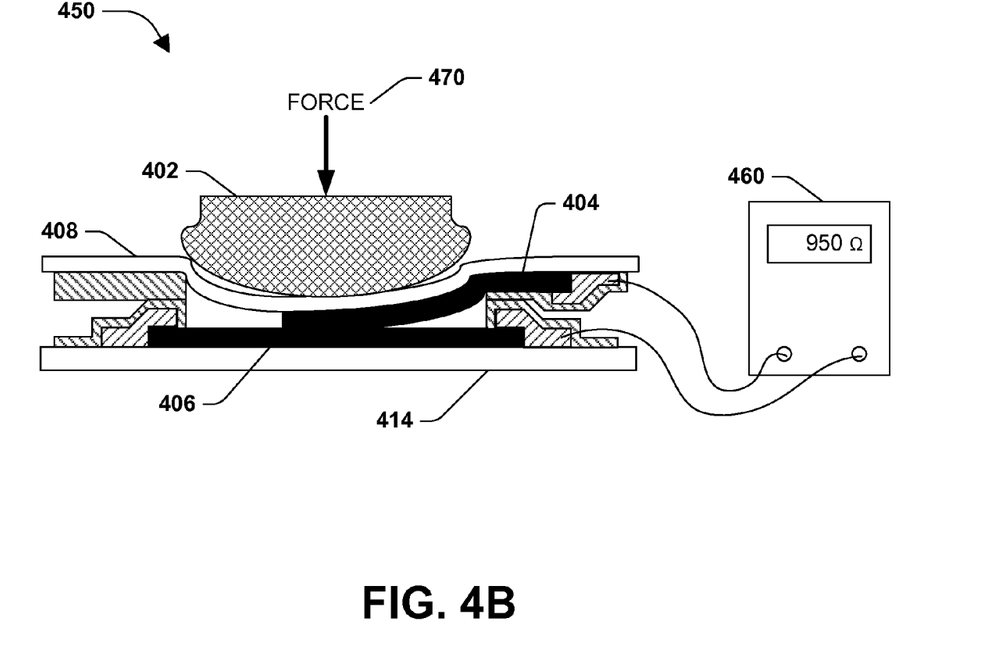

As an example, the bottom surface 414 can comprise a transparent material, such as glass or rigid plastic and the contact area (patch) may be observed from an underside of the bottom surface 414. In one embodiment, if an elastomeric substance 402 used in the pressure sensor sample (e.g., and pressure sensor) comprises a relatively uniform shape and consistency, the area comprising the patch should be relatively circular. In this embodiment, for example, a diameter of the circular area of the patch may be measured, and provided as the indication of a patch measurement corresponding to the force indication. That is, in this example, the force applied 470 may be measured (or known), and the corresponding patch area diameter may also be measured. For example, as more force is applied, the size of the patch increases as more of the top surface 408 contacts the bottom surface 414.

Returning to FIG. 1, at 108, the linearized pressure sensor pattern is generated based at least upon the force indication and the patch measurement indication. In one embodiment, the patch measurement can be made at respective applied force increments from a first increment to an X number increment, where X corresponds to a desired number of increments. For example, pressure can be applied to the sensor sample in linear increments (e.g., monotonically increasing at equivalent increments of force) between a point of first contact between the top and bottom surface to a point of sensor saturation (e.g., added pressure may not change patch size and/or a resistance reading in the pressure sensor).

In one embodiment, the point of sensor saturation may comprise a force saturation for the pressure sensor sample, and/or a patch saturation for the pressure sensor sample. For example, force saturation may be identified as a point when application of additional force no longer changes the area of the patch, or may lead to breaking of the pressure senor. As another example, patch saturation may be identified as a point when the patch covers an area equivalent to an intended bottom conductor for the sensor, such that additional application of force would not result in a measurable change in the electrical property for the pressure sensor (e.g., increasing patch size yields little to no change in measured property as no additional conductive material is contacted).

In one embodiment, because the patch measurement is known for respective, linear, applied force increments, an area of contact between the top conductor and bottom conductor may be inferred for the respective force increments. In this embodiment, for example, a conductor pattern may be designed for the pressure sensor that corresponds to the respective patch measurements, which correspond to the linear applied force increments. In this way, for example, the resulting conductor pattern for the conductor layer(s) of the pressure sensor (e.g., 404 and/or 406 of FIG. 4A) may be able to produce a linear electrical property result when force is applied to the pressure sensor.

A linearized pressure sensor pattern may allow for a linear relationship between the applied force and the resulting electrical property measurement from the point of first contact to the point of sensor saturation. As an illustrative example, in FIGS. 4A and 4B, the linearized pressure sensor pattern may be used as a template for printing the top conductor 404 and/or bottom conductor 406 (e.g., using a carbon-based resistance conductor material). In this example, when force 470 is applied to the elastomeric material 402, making the top surface 408 deflect toward the bottom surface 414, the top conductor 404 contacts the bottom conductor 406.

Further, as more force is applied 470 the elastomeric material 402 can deform, thereby increasing the deflection of the top surface 408, resulting in a large point of contact between the top conductor 404 and bottom conductor 406. In this example, for respective increases in applied force 470, a proportional decrease in resistance (e.g., or increase in conductivity) may result, due to the linearized pattern of the top and/or bottom conductor. In this way, for example, a same amount of applied force increment results in a substantially same decrement of resistance (e.g., or increment of conductivity) whether applied at first contact or near the point of sensor saturation.

It may be appreciated that characteristics of a measurement circuit may be considered, accommodated, accounted for, etc. when designing a conductor pattern. This may, for example, allow non-linear properties imparted by using a resistor divider and an ADC (Analog to Digital converter) to be mitigated, given that resistor dividers have a transfer function Vmeasure=Vapplied*Rbottom/(Rtop+Rbottom), where Vmeasure is a voltage measured by the measurement circuit, Vapplied is a voltage applied to the measurement circuit, Rbottom is a resistivity of the bottom conductor 406 and Rtop is a resistivity of the top conductor 404. Non-linear characteristic could be backed out of a combined transfer function if, for example, such a transfer function comprised Vmeasure=Force_applied*K, where K is a constant that is characterized and/or statistically determined from data that may be acquired as multiple sensors are manufactured.

Returning to FIG. 1, having generated the linearized pressure senor pattern, the exemplary method 100 ends at 110.

Figure 2:
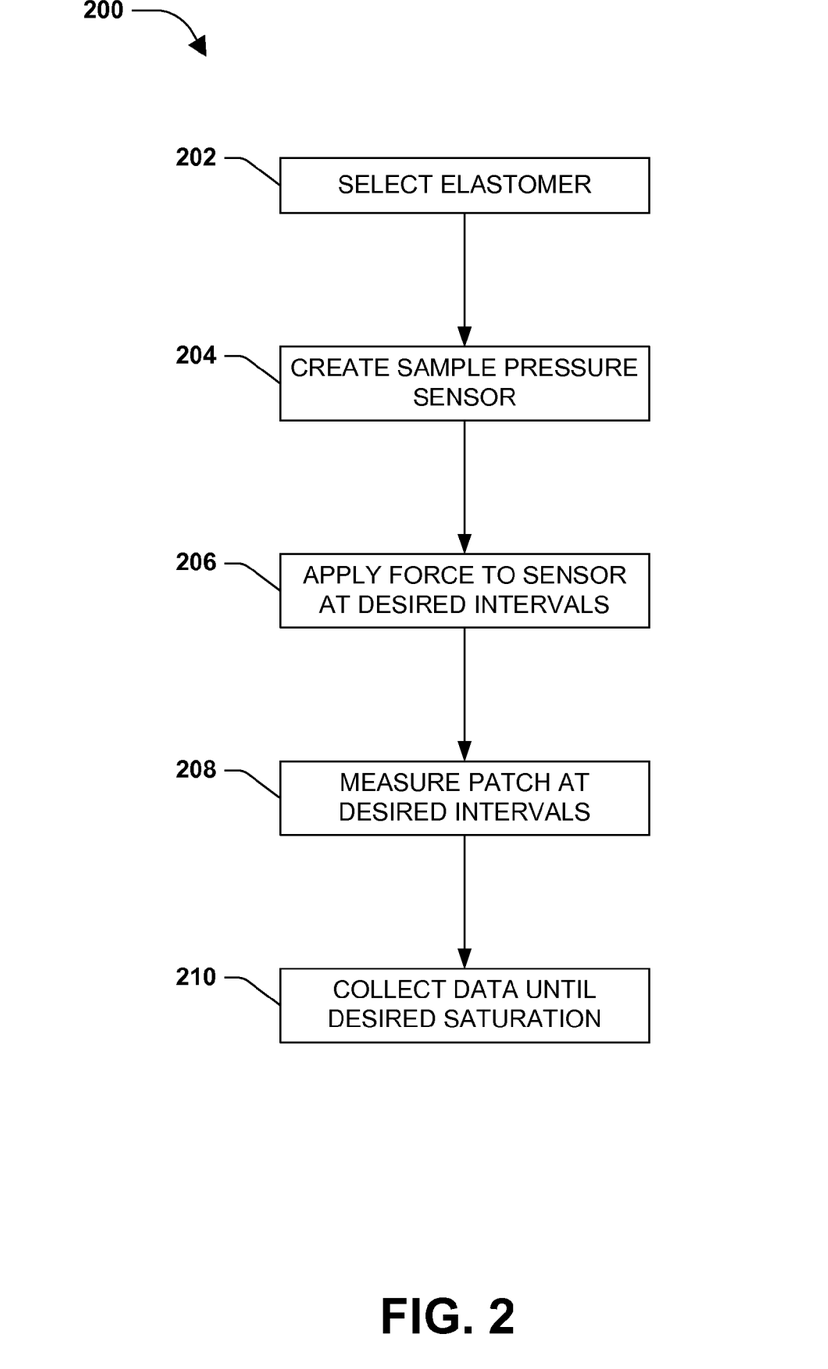
FIG. 2 is a flow diagram illustrating an example embodiment of one or more portions of one or more techniques described herein.

FIG. 2 is a flow diagram illustrating an example embodiment 200 of one or more portions of one or more techniques described herein. At 202, at elastomer may be selected. For example, a pressure sensor may be used in a variety of products, such as a computer keyboard, electronic musical instrument, or some other input device where different levels of applied force input may be used to provide differing output results. As an illustrative example, using FIGS. 4A and 4B, a design engineer working on the pressure sensor for a product may utilize a particular elastomer for the elastomeric component 402 that comprises desired characteristics for the product.

In this example, some characteristics may comprise elasticity, deformation character, durability, and more. Further, one or more of these characteristics may affect how the top conductor 404 contacts the bottom conductor 406 in the pressure sensor, such as how the elastomer deforms when force is applied. Therefore, for example, the engineer may go through one or more iterations of the pressure sensor design until a desired result is achieved for the elastomeric material 402, which can comprise how the top conductor 404 and bottom conductor 406 interact with one another to yield the desired result.

At 204, a sample, pressure sensor can be created. As an illustrative example, using FIGS. 4A and 4B, the sample pressure sensor can comprise respective components of the pressure sensor intending to utilize a linearized pattern for the top conductor 404 and/or bottom conductor 406. Such a sample pressure sensor may comprise a top surface 408 (e.g., onto which the top conductor 404 may be printed for the pressure sensor), a bottom surface 414 (e.g., onto which the bottom conductor 406 may be printed for the pressure sensor), an elastomeric material 402 (e.g., to which force may be applied), one or more insulators 412, and/or one or more conductor wiring components 416, etc. In one embodiment, the bottom surface 414 can comprise a transparent material that allows for a patch area (e.g., an area of contact between the top surface 408 and the bottom surface 414) to be observed and measured (e.g., by looking through the bottom surface from underneath).

Returning to FIG. 2, at 206, force can be applied to the sensor at desired intervals. For example, a desired interval of applied force can be identified, the amount of force applied to reach a point of first contact between the top surface 408 and the bottom surface 414 can be identified, and then incremented by the desired interval. At 208, a corresponding patch area can be measured at the respective desired intervals of applied force. In one embodiment, the desired interval of applied force can comprise a substantially equivalent force delta, for example, such that the applied force changes by the same amount for each interval (e.g., first applied force is 1 lb, second applied force is 2 lbs, third applied force is 3 lbs, etc.).

In this embodiment, a patch measurement may be determined at the respective intervals. For example, the desired amount of force can be applied to the pressure sensor sample, such as at the respective intervals, a diameter of the patch can be measured (e.g., the contact area of the top and bottom surfaces viewed from underneath the bottom surface). As an illustrative example, in FIGS. 4A and 4B, when no force is applied to the elastomeric membrane in the example 400, the top and bottom surfaces 408, 414 do not contact; but when force is applied 470, at 450, these surfaces may meet and the contact area can increase in size as the elastomeric material 402 expands due to increased applied force. Therefore, in one embodiment, the increase in force applied corresponds to an increase in patch area measurement (e.g., diameter of patch), at least up to saturation, for example.

Returning to FIG. 2, at 210, data comprising the applied force and corresponding patch measurement can be collected until a point of desired saturation. In one embodiment, the point of desired saturation can comprise a point where increasing the application of force to the top surface, such as by pressing on the elastomeric material, no longer results in an increase in patch size. That is, for example, the top surface, and/or elastomeric material can no longer expand to create a larger contact area with the bottom surface when more pressure is applied.

In another embodiment, the point of desired saturation can comprise a point where the patch size is at least as large as a desired contact area size. For example, as illustrated in FIG. 4B, a contactable surface of the bottom conductor 406 can be designed to be a certain size (e.g., based on desired output characteristics). In this example, once a contact area of the top conductor 404 reaches the extent of the designed contactable surface of the bottom conductor 406, additional application of force may not produce any additional change in output (e.g., electrical resistance, conductivity, etc.). Therefore, in this embodiment, the desired saturation point can comprise the amount of force needed to create a contact area that reaches the extent of the desired (e.g., designed) contactable surface area of the bottom conductor 406.

In one embodiment, the patch measurement may be determined using an imaging sensor to capture the patch measurement at one or more of the desired force intervals. For example, a digital camera may be mounted beneath the bottom surface of the sensor sample, where the bottom surface is transparent. The digital camera can capture an image of the contact area (e.g., patch) of the top surface 408 of the sensor sample touching the bottom surface 414 of the sensor sample, and a digital measurement of the contact area can be determined. In one embodiment, the measurement can comprise a diameter of the patch, for example, where the diameter may comprise an average diameter of the patch (e.g., a plurality of diameter measurements, taken at respective force levels, can be identified for respective applied forces and averaged).

Figure 3:
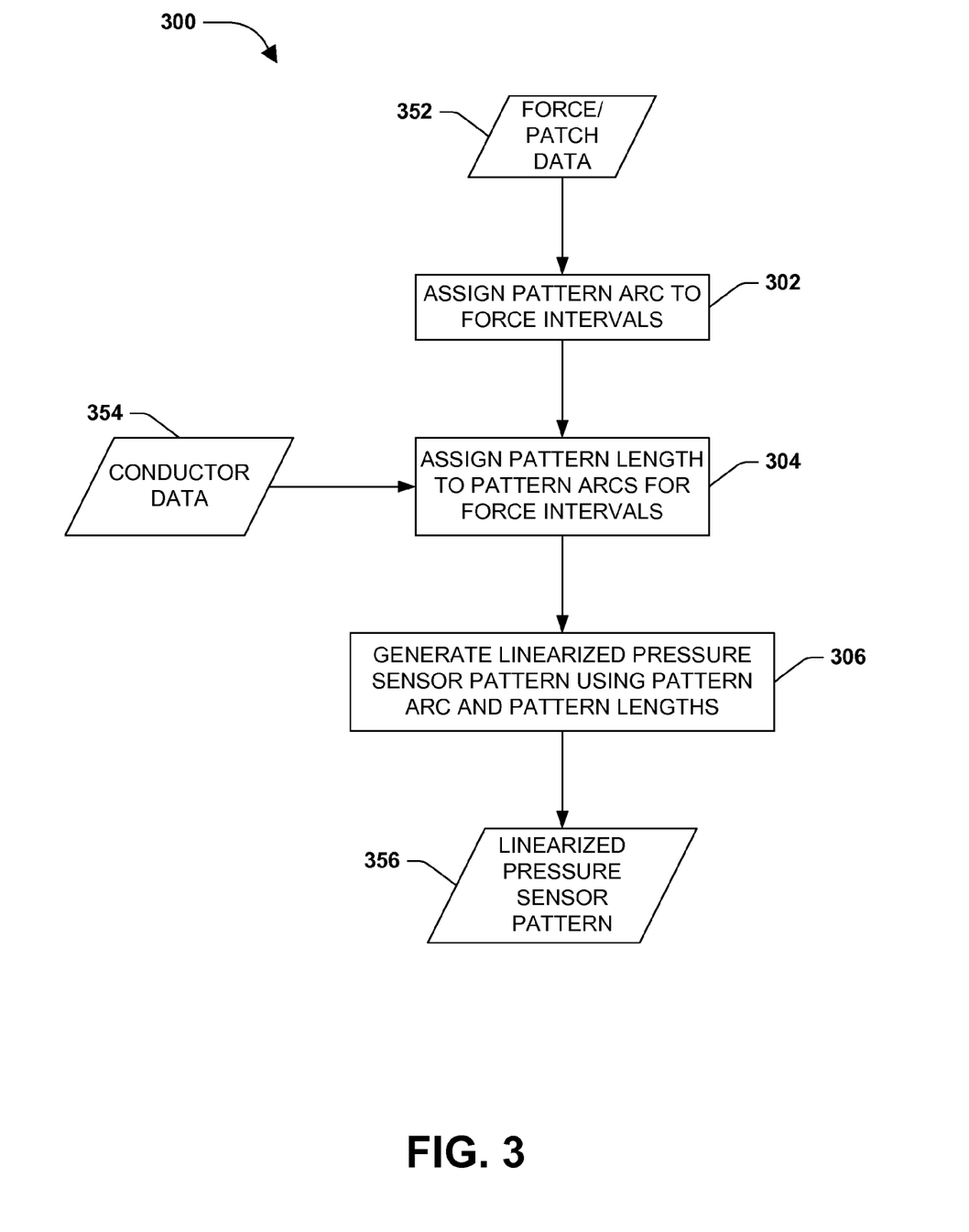
FIG. 3 is a flow diagram illustrating an example embodiment of one or more portions of one or more techniques described herein.
Figure 5:
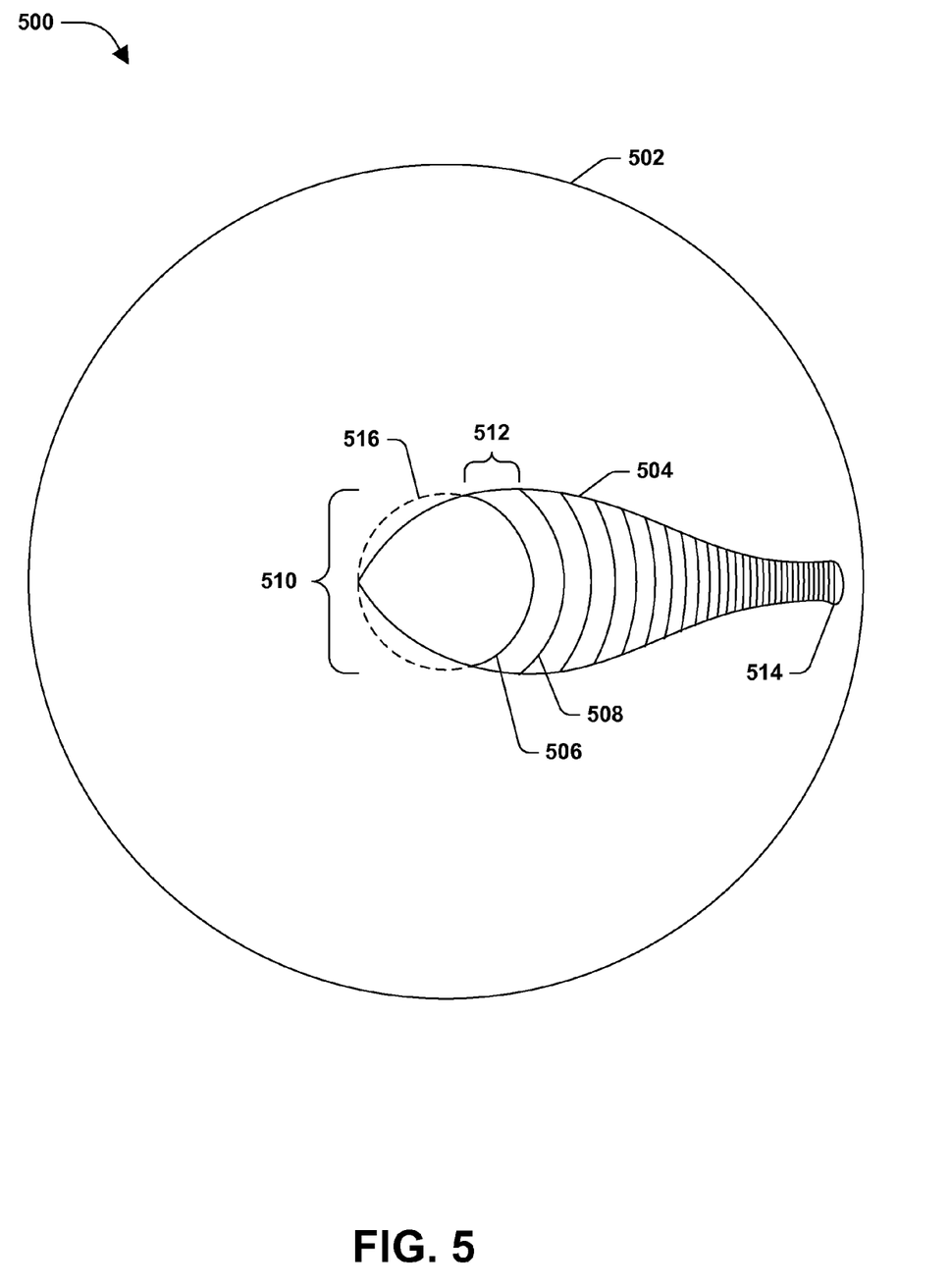
FIG. 5 is a diagram illustrating an example embodiment of a linearized pressure sensor pattern construction.

FIG. 3 is a flow diagram illustrating an example embodiment 300 of one or more portions of one or more techniques described herein. Using applied force and patch measurement data 352, a pattern arc can be assigned to a desired force interval based at least upon a force indication (e.g., comprising an applied force) and a patch measurement indication (e.g., comprising a patch size corresponding to the applied force). As an illustrative example, FIG. 5 is a diagram illustrating an example embodiment 500 of a linearized pressure sensor pattern construction. The example embodiment 500 comprises a pressure sensor potential contact area 502 and a pressure sensor contact pattern 504 or actual contact area.

Further, in the example embodiment 500, a first pattern arc 506 comprises a portion of a first area 516 that has a diameter equivalent to the patch area corresponding to a first applied force. As an example, the first applied force from the force and patch data 352 collected using the pressure sensor sample (e.g., per FIG. 2) can have a corresponding first patch measurement, comprising a diameter of the contact area of the top and bottom surfaces. In this example, the first patch measurement can be used to determine a location of the first pattern arc 506, which corresponds to the first applied force.

Additionally, a second pattern arc 508 can correspond to a second applied force, where a distance 512 between the first arc 506 and second arc 508 can comprise a difference in the patch size between the first applied force and a second force. In this example, the pressure sensor contact pattern 504 can comprise a plurality of arcs, respectively corresponding to applied force intervals, where the location of the arc in the pressure sensor contact pattern 504 may represent a patch size measurement for the corresponding applied force at the interval. A last pattern arc 514, in this example, may represent a point of saturation for the application of force. That is, for example, an increase in application of force to a top surface (e.g., or elastomeric material in contact with the top surface) of the pressure sensor producing the example pattern 504 may not result in an increase in a contact area between the top and bottom conductors (e.g., 404, 406 of FIG. 4B). Accordingly, at 302 in FIG. 3, pattern arcs can be assigned to force intervals (e.g., what arcs are produced by what forces).

At 304 in FIG. 3, respective arc lengths can be assigned to pattern arcs (e.g., using an electrical property of a contact pattern material 354 (conductor data used for the linearized pressure sensor pattern). For example, as illustrated in FIG. 4B, the example pressure sensor 450 comprises a top conductor 404 and a bottom conductor 406, which can be respectively adhered to the top surface 408 and the bottom surface 414. When the top 404 and bottom 406 conductors come into contact, a change in electrical property may be detected, such as decreased resistance 460 if the conductors comprise a resistive conductor material, or an increase in conductivity if conductance is used as a desired electrical property.

Further, the resistive conductor material or type of conductor material used in the linearized pressure sensor pattern may have differing characteristics that provide for different rates of resistance decrease (e.g., or other desired electrical property). In one embodiment, the extent of change for the electrical property may help determine the arc length for the pattern arc. As an illustrative example, in FIG. 5, an arc length 510 for the second pattern arc 508 can be determined by an extent of change of the electrical property of the material intended to be used for the pressure sensor. For example, a material having a high value of resistance per square may have shorter arc lengths (e.g., resulting in a narrower, more compact, etc. pattern 504) than a material having a low value of resistance per square. In one embodiment, the resistance per square may comprise a resistance property value of square area of applied conductor/resistor, which, regardless of a size of the square area, the resistance property remains substantially the same at a thickness that is constant.

Returning to FIG. 3, at 306, a linearized pressure sensor pattern 356 can be generated using the respective pattern arcs and corresponding arc lengths. In one embodiment, the generated linearized pressure sensor pattern 356 can be used to create a pressure sensor conductor (e.g., 404 and/or 406 of FIGS. 4A and 4B) that provides an inversely proportional linear electrical resistance to applied force relationship when used in a pressure sensor. In another embodiment, the generated linearized pressure sensor pattern 356 can be used to create a pressure sensor conductor that provides a proportional linear electrical conductivity to applied force relationship.

As an illustrative example, in FIG. 5, a shape of the linearized pressure sensor pattern 504 may be determined by the respective pattern arcs (e.g., 506, 508, 514), and the respective pattern arc lengths (e.g., 510). In this example, the shape of the linearized pressure sensor pattern 504 tapers down from the second arc 508 to the last arc 514, and the distance 512 between arcs decreases from the first arc 506 to the last arc 514. As described above, the distances can correspond to the patch measurement at the respective applied force intervals, for example, and the length of the pattern arcs may be determined by the electrical properties of the material used for the conductors (e.g., 404, 406 of FIGS. 4A and 4B).

In this way, for example, the resulting pattern provides a linear relationship between the applied force and an electrical property output when used in the pressure sensor. In the example embodiment 450 of FIG. 4B, for example, as increasing force is applied 470, the top conductor 404 (e.g., comprising the linear pressure sensor pattern) has an increasing contact area with the bottom conductor 406. In this example, the increased contact area between the top 404 and bottom 406 conductors results in a proportional decrease in measured resistance 460. Therefore, in this example, as applied force increases, resistance output decreases in a linear manner.

A system may be devised that can facilitate creation of a linearized pressure sensor. A linearized pressure sensor may be able to translate force applied to the sensor to an electrical output, where an increase in force results in a linear (e.g., proportional) increase (e.g., or decrease) in the electrical output. In this way, for example, a measurement or detection of the output may be easier and/or may be performed using less expensive electrical measurement circuits. For example, when a pressure sensor comprises a non-linear (e.g., exponential) relationship between the increase in force and output of the electrical property, measuring a difference in output near a force saturation point may require an electrical measurement circuit that can detect very small changes. However, if the relationship is linear, the change in output remains constant throughout the application of force, which may be easier (e.g., and cheaper) to measure.

Figure 6:
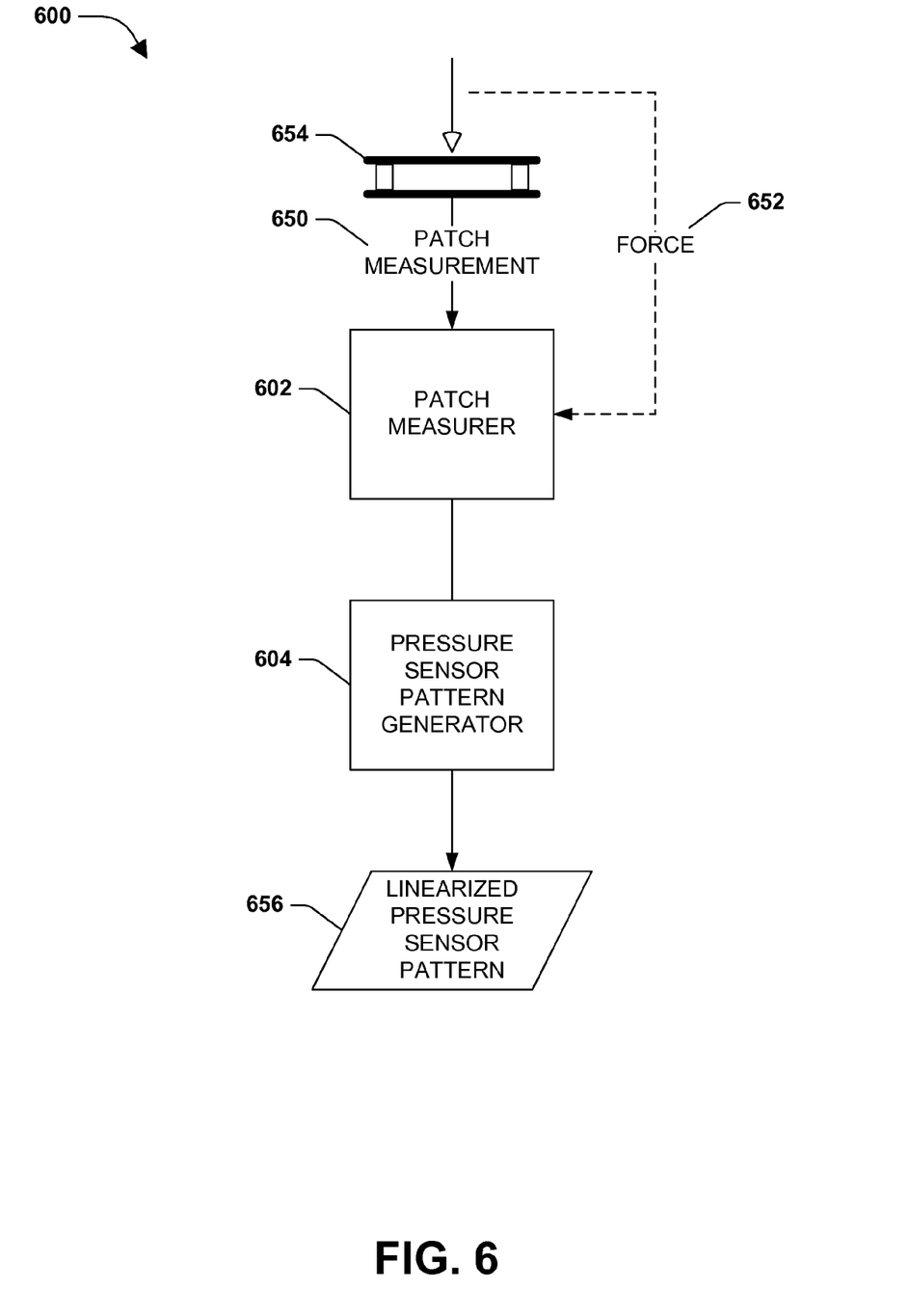
FIG. 6 is a component diagram illustrating an exemplary system for generating a linearized pressure sensor pattern for a pressure sensor.

FIG. 6 is a component diagram illustrating an exemplary system 600 for generating a linearized pressure sensor pattern for a pressure sensor. A patch measurement component 602 is configured to determine a patch measurement 650 that corresponds to a force applied 652 to a sample version 654 of the electrical pressure sensor. For example, a known amount of force 652 may be applied to the sample version 654, and the patch measurement component 602 can measure a size of the resulting patch.

In one embodiment, the sample version 654 of the electrical pressure sensor can comprise components arranged as an electrical pressure sensor without a contact pattern conductor layer (e.g., conductors between a top and bottom surface). In this embodiment, the patch can comprise a contact area of the top and bottom surfaces in the sample version 654. Further, the patch measurement 650 can comprise a diameter of the contact area of the top and bottom surfaces in the sample version 654. In this embodiment, for example, the patch measurement component 602 can determine a patch measurement 650 for the contact area corresponding to respective levels of applied force 652.

A pressure sensor pattern generation component 604 is operably coupled with the patch measurement component 602. The pressure sensor pattern generation component 604 is configured to generate the linearized pressure sensor pattern 656 using the applied force 652 and the corresponding patch measurement 650. For example, the applied force 652 can be increased by a same amount (force interval), and at respective force intervals the patch measurement component 602 may determine a corresponding patch measurement 650.

In this way, for example, respective increases in applied force 652 can have a corresponding measurement of the resulting patch size (e.g., diameter). In this example, the resulting data comprises a relationship between applied force and patch size. The resulting data can be used to create a pattern for a pressure sensor conductive layer that linearizes the force to electrical property relationship, such that an increase of force on the pressure sensor using the linearized pattern results in a linear decrease (e.g., or increase) in electrical property output (e.g., resistance, conductivity, etc.).

Figure 7:
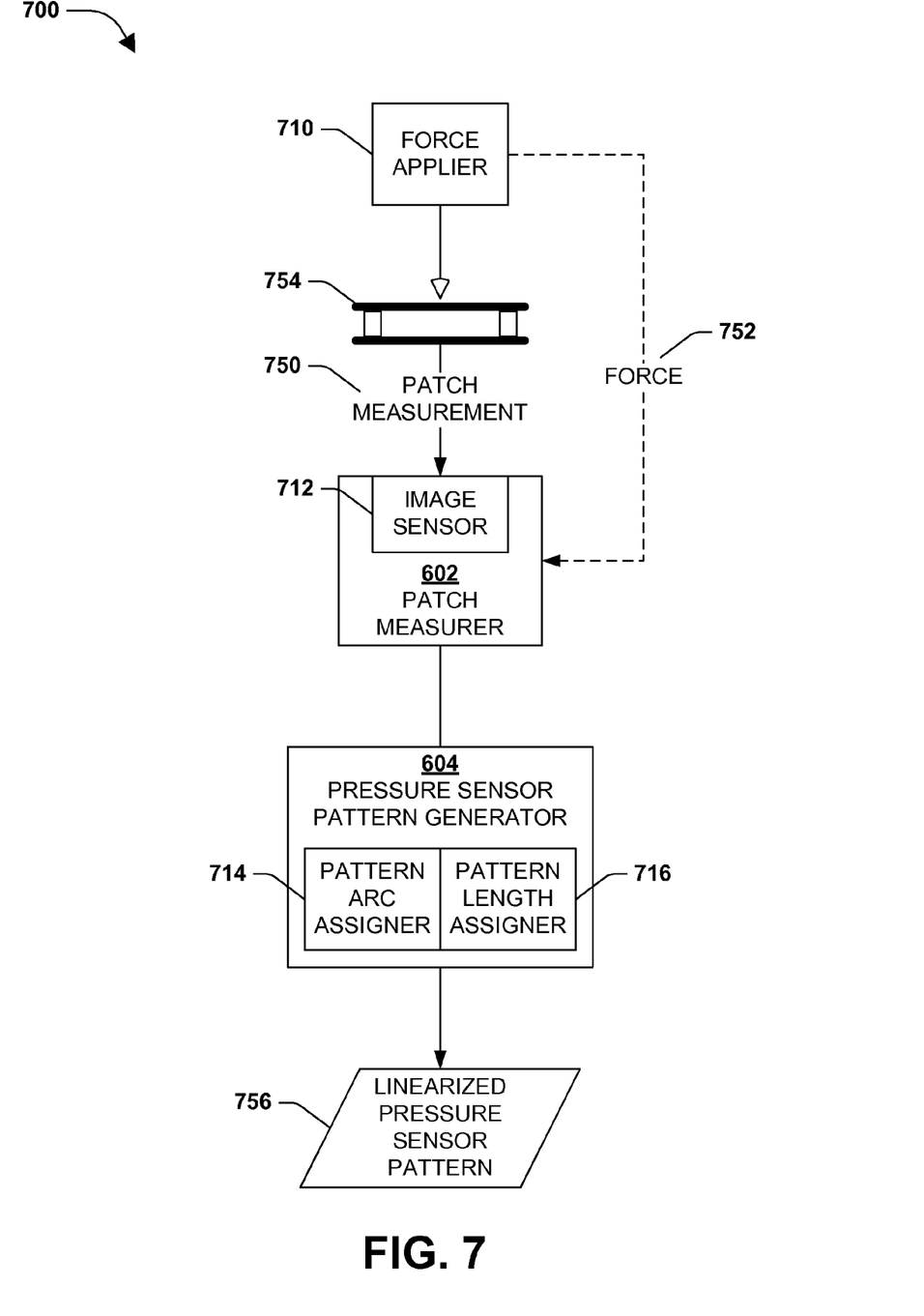
FIG. 7 is a component diagram illustrating an example embodiment where one or more systems described herein may be implemented.

FIG. 7 is a component diagram illustrating an example embodiment 700 where one or more systems described herein may be implemented. In this example, an extension of FIG. 6 is provided and thus description of elements, components, etc. described with respect to FIG. 6 may not be repeated for simplicity. A force application component 710 can be configured to apply a desired force 752 to a sample version 754 at one or more force intervals. In one embodiment, the respective one or more force intervals can comprise a substantially same force delta between desired force applications.

For example, the force application component 710 can apply a first known force 752 to the sample version 754, a second known force 752 to the sample version 754, and a third known force 752 to the sample version 754. In this example, the difference between the first and second known forces, and the difference between the second and third known forces is substantially the same. Further, in this example, the force delta, comprising the change in force applied, can remain substantially constant for respective known force applications 752 to the sample version 754. In this way, for example, the force application may apply the known force 752 to the sample version 754 at constant intervals until a point of force saturation is reached.

The patch measurement component 602 can comprise an image sensor component 712 that is configured to determine respective patch measurements 750 at one or more desired force intervals 752. For example, the image sensor component 712 may comprise a digital image capture device that captures an image of the patch at the respective known force intervals. Further, in this example, the patch measurement component 602 can use the captured image to measure the size of the patch, such as by measuring a diameter of an area comprising the contact area between the top and bottom surfaces of the sample version 754. As an illustrative example, a detectable (e.g., visible) change in light transmission at a border of a contact area between the top surface and the bottom surface can be identified in respective captured images to determine a size of the patch.

In this example embodiment 700, the pressure sensor pattern generation component 604 can comprise a pattern arc assignment component 714 that may be configured to assign a pattern arc to a desired force interval based at least upon the applied force 752 and the patch measurement 750. For example, the patch measurements corresponding to the respective applied force intervals may be used to identify respective locations of the pattern arcs. As an illustrative example, a pattern arc may comprise a portion of a circle that comprises an area described by the patch measurement (e.g., diameter of the patch). In this example, the location of the pattern arc may comprise a distance from a beginning of the resulting pattern corresponding to the patch measurement (e.g., a diameter or radius).

The pressure sensor pattern generation component 604 may also comprise an arc length assignment component 716 that is configured to assign respective arc lengths for the pattern arcs using an electrical property of a contact pattern material used for the linearized pressure sensor pattern 756. For example, the pattern arc location may be determined by the pattern arc assignment component 714 and the length of the pattern arc can be determined by the arc length assignment component 716. Because a rate of electrical property change of the material used for the conductive layer in the pressure sensor may be different for different materials, the type of material may dictate the length of the pattern arc. For example, as a material's rate of resistance decreases (e.g., based on resistance per area of material, such as resistance conductor ink, at a calibrated thickness) a length of the respective patterns arc may increase to accommodate the linear relationship between the applied force and resistance output.

In one embodiment, a resulting linearized pressure sensor pattern 756 can comprise a concatenation of one or more pattern arcs, respectively comprising a corresponding arc length. For example, the linearized pressure sensor pattern can comprise a shape that conforms to the pattern arcs at their respective lengths.

As an illustrative example, in FIG. 5, a resulting linearized pressure sensor pattern 504 incorporates the respective pattern arcs (e.g., 506, 508, 514) at their respective lengths 510. In one example, the pattern 504 may be used as a template for printing resistance conductor ink as a first conductor layer of the pressure sensor. In this example, when force is applied to the pressure sensor, a portion of the pattern 504 (as the first conductor) can contact a second conductor layer resulting in a corresponding resistance output. Further, in this example, when additional force is applied, a greater portion of the pattern 504 (as the first conductor) will contact the second conductor layer resulting in a linear decrease in the resistance output.

Figure 8:
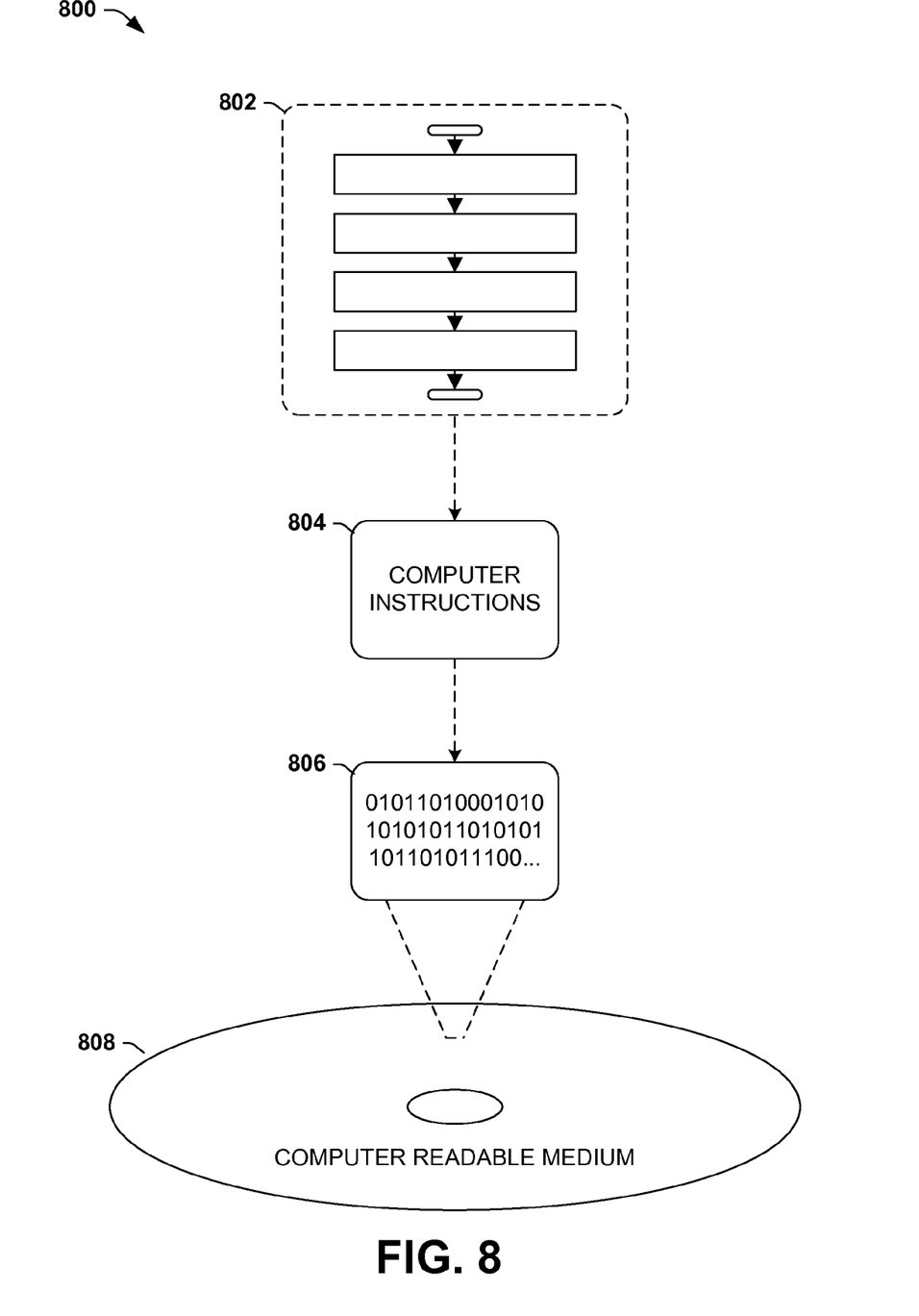
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 808 (e.g., a CD-R, DVD-R, or a platter of a hard disk drive), on which is encoded computer-readable data 806. This computer-readable data 806 in turn comprises a set of computer instructions 804 configured to operate according to one or more of the principles set forth herein. In one such embodiment 802, the processor-executable instructions 804 may be configured to perform a method, such as at least some of the exemplary method 100 of FIG. 1, for example. In another such embodiment, the processor-executable instructions 804 may be configured to implement a system, such as at least some of the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
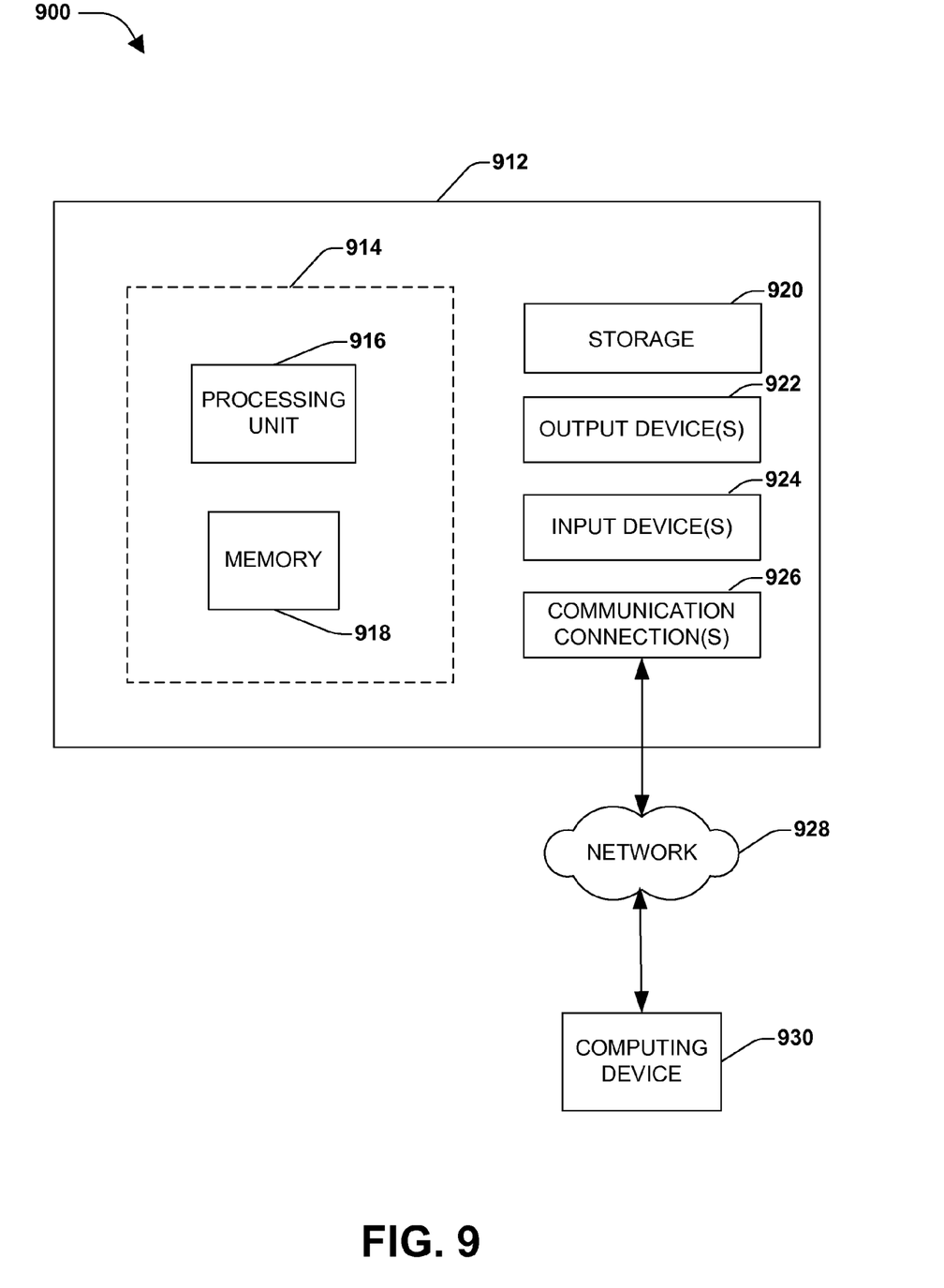
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for generating a linearized pressure sensor pattern, comprising:
    receiving an indication of a force applied to a pressure sensor sample;
    receiving an indication of a patch measurement corresponding to the force applied;
    generating the linearized pressure sensor pattern based at least upon the indication of the force applied and the indication of the patch measurement, the linearized pressure sensor pattern comprising a first pattern arc corresponding to the force applied and a second pattern arc corresponding to a second force applied to the pressure sensor sample, the first pattern arc different than the second pattern arc; and
    creating a pressure sensor conductor using the linearized pressure sensor pattern.

2. The method of claim 1, comprising receiving an indication of a second patch measurement corresponding to the second force applied.

3. The method of claim 2, the linearized pressure sensor pattern comprising a third pattern arc corresponding to a third force applied to the pressure sensor sample, the third pattern arc different than the first pattern arc and the second pattern arc.

4. The method of claim 1, comprising receiving indications of forces applied to the pressure sensor sample and indications of patch measurements corresponding to the forces applied until one or more of:
    patch size saturation; or
    force saturation.

5. The method of claim 1, the pressure sensor sample corresponding to a pressure sensor for a keyboard.

6. The method of claim 1, the pressure sensor sample corresponding to a pressure sensor for an electronic musical instrument.

7. The method of claim 1, creating a pressure sensor conductor comprising using a transfer function.

8. The method of claim 3, comprising receiving an indication of a third patch measurement corresponding to the third force applied.

9. The method of claim 8, comprising receiving an indication of the second force applied and an indication of the third force applied.

10. The method of claim 3, a first force delta between the force applied and the second force applied substantially equal to a second force delta between the second force applied and the third force applied.

11. The method of claim 1, receiving an indication of a patch measurement comprising receiving a signal from an image sensor.

12. A system for generating a linearized pressure sensor pattern, comprising:
    a patch measurement component configured to determine a patch measurement corresponding to a force applied to a sample version of a pressure sensor; and
    a pressure sensor pattern generation component configured to generate the linearized pressure sensor pattern based at least upon the force applied and the patch measurement, the linearized pressure sensor pattern comprising a first pattern arc corresponding to the force applied and a second pattern arc corresponding to a second force applied to the sample version, the first pattern arc different than the second pattern arc, the linearized pressure sensor pattern used to create a pressure sensor conductor.

13. The system of claim 12, comprising a force application component configured to apply force to the sample version at one or more force intervals.

14. The system of claim 12, a first force delta between the force applied and the second force applied substantially equal to a second force delta between the second force applied and a third force applied to the sample version.

15. The system of claim 12, the patch measurement component comprising an image sensor component configured to determine the patch measurement.

16. The system of claim 12, the sample version corresponding to a pressure sensor for a keyboard.

17. The system of claim 12, the sample version corresponding to a pressure sensor for an electronic musical instrument.

18. The system of claim 12, the pressure sensor pattern generation component configured to generate the linearized pressure sensor pattern based at least upon a transfer function.

19. The system of claim 12, the sample version not comprising a contact pattern conductor layer.

20. A computer readable medium comprising computer executable instructions that when executed perform a method for generating a linearized pressure sensor pattern, comprising:

determining a patch measurement for a force applied to a pressure sensor sample;

generating the linearized pressure sensor pattern based at least upon the force applied and the patch measurement, the linearized pressure sensor pattern comprising a first pattern arc corresponding to the force applied and a second pattern arc corresponding to a second force applied to the pressure sensor sample; and facilitating creation of a conductor for a pressure sensor using the linearized pressure sensor pattern.

\* \* \* \* \*